US010960981B2

(12) United States Patent
Metten

(10) Patent No.: US 10,960,981 B2
(45) Date of Patent: Mar. 30, 2021

(54) AIRCRAFT REGION, AIRCRAFT AND METHOD OF LOADING AN AIRCRAFT REGION

(71) Applicant: Airbus Operations GmbH, Hamburg (DE)

(72) Inventor: Martin Metten, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 361 days.

(21) Appl. No.: 16/006,530

(22) Filed: Jun. 12, 2018

(65) Prior Publication Data

US 2018/0362164 A1    Dec. 20, 2018

(30) Foreign Application Priority Data

Jun. 14, 2017  (DE) .......................... 102017210007.9

(51) Int. Cl.
*B64D 11/00* (2006.01)
*B64D 11/06* (2006.01)

(52) U.S. Cl.
CPC .......... *B64D 11/003* (2013.01); *B64D 11/064* (2014.12)

(58) Field of Classification Search
CPC ............................ B64D 11/003; B64D 11/064
See application file for complete search history.

(56) References Cited

U.S. PATENT DOCUMENTS

| 2,674,300 A | 4/1954 | Liljengren et al. |
| 6,874,731 B1 * | 4/2005 | Brauer ................. B64D 11/003 244/118.5 |
| 2003/0094837 A1 * | 5/2003 | Williamson ....... B64D 11/0696 297/163 |
| 2006/0237585 A1 * | 10/2006 | Lau et al. ............ B64D 11/003 244/118.5 |

(Continued)

FOREIGN PATENT DOCUMENTS

| DE | 102009014573 | 9/2010 |
| DE | 102011105005 | 12/2012 |

(Continued)

OTHER PUBLICATIONS

German Search Report, dated May 11, 2018, priority document.

*Primary Examiner* — Brian M O'Hara
*Assistant Examiner* — Keith L Dixon
(74) *Attorney, Agent, or Firm* — Greer, Burns & Crain, Ltd.

(57) ABSTRACT

An aircraft region comprising an aisle section extending in a longitudinal direction of the aircraft region, a bench seat oriented transversely with respect to the longitudinal direction and having a first seat adjacent to the aisle section and a second seat arranged remote from the aisle section, and an aircraft stowage bin system having a first stowage bin arranged at least in part above the first seat and a second stowage bin arranged at least in part above the second seat. The first stowage bin has a first rear side facing away from the aisle section, and the second stowage bin has a second (Continued)

rear side facing away from the aisle section. The second stowage bin is arranged above the second seat such that it is accessible for a person sitting on the second seat or standing in the longitudinal direction in front of the second seat.

14 Claims, 5 Drawing Sheets

(56) References Cited

U.S. PATENT DOCUMENTS

| | | | |
|---|---|---|---|
| 2011/0139929 A1* | 6/2011 | Young et al. | B64D 11/003 244/118.5 |
| 2012/0012705 A1 | 1/2012 | Mayer et al. | |
| 2012/0248246 A1* | 10/2012 | Savian | B64D 11/06 244/118.6 |
| 2012/0318917 A1 | 12/2012 | Schneider et al. | |
| 2014/0300162 A1* | 10/2014 | Udriste | B64D 11/06 297/340 |
| 2015/0158588 A1 | 6/2015 | Moje et al. | |
| 2015/0166179 A1 | 6/2015 | Moje et al. | |
| 2015/0210393 A1* | 7/2015 | Savian | B64D 11/0605 244/118.6 |
| 2016/0288908 A1* | 10/2016 | Moje | B64D 11/003 |
| 2018/0215467 A1* | 8/2018 | Sankrithi | B64D 11/003 |

FOREIGN PATENT DOCUMENTS

| | | |
|---|---|---|
| DE | 102013021108 | 6/2015 |
| DE | 102013021109 | 6/2015 |
| DE | 102013021449 | 6/2015 |
| EP | 2411271 | 2/2012 |
| EP | 2537752 | 12/2012 |

\* cited by examiner

AIRCRAFT REGION, AIRCRAFT AND METHOD OF LOADING AN AIRCRAFT REGION

CROSS-REFERENCES TO RELATED APPLICATIONS

This application claims the benefit of the German patent application No. 10 2017 210 007.9 filed on Jun. 14, 2017, the entire disclosures of which are incorporated herein by way of reference.

BACKGROUND OF THE INVENTION

The present invention relates to an aircraft region, to an aircraft having such an aircraft region, and to a method of loading such an aircraft region.

Modern aircraft have a large number of stowage bins arranged in the ceiling region of an aircraft cabin, which stowage bins are arranged side by side above the seats in the ceiling region in the form of rows of stowage bins in the longitudinal direction of the aircraft cabin. These stowage bins are used, in particular, for stowing the passengers' hand luggage, articles provided by the airline for use by the passengers, such as blankets or pillows, as well as entertainment material, such as newspapers and magazines. The stowage bins can be in the form of, for example, movable bins or fixed bins. Stowage bins in the form of movable bins have a chute which is folded down from the closed position of the stowage bin into the open position in order to open the stowage bin. Fixed bins, on the other hand, have a cover flap which can be pivoted in order to open the stowage bin. Such stowage bins are described, for example, in documents DE 10 2011 105 005 A1, US 2012 318 917 A1 and EP 2 537 752 A1, DE 10 2009 014 573 A1, EP 2 411 271 A1 and U.S. Pat. No. 2,012,012 705 A1.

SUMMARY OF THE INVENTION

Against this background, it is an object of the present invention to provide an aircraft region which can be loaded and unloaded quickly and efficiently and can be used flexibly. In addition, it is an object of the invention to provide an aircraft having such an aircraft region and a method of loading such an aircraft region.

The aircraft region, which can be a section of a single-deck aircraft or a section of a lower or upper deck of a multi-deck, in particular double-deck, aircraft, comprises an aisle section extending in a longitudinal direction of the aircraft region, as well as a bench seat, oriented transversely with respect to the longitudinal direction, having a first seat adjacent to the aisle section and a second seat which is arranged adjacent to a side of the bench seat that is remote from the aisle section. The first seat can be an aisle-side seat. In addition, the bench seat can have further seats, for example at least three or at least four seats in total. If the aircraft region additionally has a wall section, the seat remote from the first seat can be a wall-side seat which is arranged adjacent to the wall section. Within the context of this invention, adjacent can mean, for example, adjoining.

The aircraft region further comprises an aircraft stowage bin system which has a first stowage bin arranged at least in part above the first seat and a second stowage bin arranged at least in part above the second seat. The first stowage bin has a first rear side facing away from the aisle section and can additionally have a first end remote from the first rear side. The second stowage bin has a second rear side facing away from the aisle section and can additionally have a second end remote from the second rear side. The second stowage bin is further arranged above the second seat in such a way that it is accessible to a person sitting on the second seat or standing in front of the second seat in the longitudinal direction.

In this manner, more luggage space and/or headroom can be made available for passengers. Even if passengers to whom the bench seat has been allocated bring so much hand luggage with them, for example, that it does not fit into the first stowage bin above the corresponding bench seat, it does not have to be distributed to other stowage bins further away from the bench seat, as long as the additional volume provided by the second stowage bin is sufficient. The passenger to whom the second seat is allocated can store his hand luggage in the second stowage bin and thus does not require access to the first stowage bin. During the flight and when preparing to leave the aircraft, that passenger, in particular, is able to collect his hand luggage again even before he steps into the aisle section. The loading and unloading time can thereby effectively be reduced and the turnaround can be shortened.

The first and/or second stowage bin preferably has an opening in the region of its first or second end, that is to say is preferably opened at its first or second end and loaded via the opening. In a cross-sectional plane extending perpendicularly with respect to the longitudinal direction, a first distance in a transverse direction of the aircraft region, that is to say, a first transverse distance, between the second end of the second stowage bin and an aisle-side end of the first seat can be greater than a second distance in the transverse direction, that is to say, a second transverse distance, between the first rear side and the aisle-side end of the first seat. The first and/or the second stowage bin can be so oriented that its main direction of extension coincides substantially with the longitudinal direction of the aircraft region. In addition, the bench seat can be oriented in the transverse direction. The second stowage bin is preferably separate from the first stowage bin. The first stowage bin can be in the form of a movable bin or in the form of a fixed bin. The second stowage bin can be in the form of a movable bin or in the form of a fixed bin.

In the context of the present invention, the transverse direction denotes a direction which is transverse with respect to the aircraft region, perpendicular to the longitudinal direction and optionally substantially parallel to a floor surface of the aircraft region. The floor surface thus extends preferably substantially parallel to a plane spanned by the longitudinal direction and the transverse direction, preferably beneath the bench seat. The cross-sectional plane is preferably oriented perpendicularly with respect to the floor surface.

At least the first stowage bin, when viewed in the cross-sectional plane, can be arranged, at least in part, without offset in the transverse direction relative to the bench seat. When a floor surface of a floor part of the aircraft region is oriented horizontally, at least a portion of the first stowage bin is in this case located vertically above the bench seat. In part, without offset in the transverse direction here means that the first stowage bin and the bench seat overlap at least partially when viewed in a direction perpendicular to the floor surface. The first stowage bin can thus be positioned in the transverse direction, at least in part, between the aisle-side end of the bench seat and an end of the bench seat remote from the aisle-side end. In addition, the second stowage bin, when viewed in the cross-sectional plane, can also be arranged, at least in part, without offset in the transverse direction relative to the bench seat. When the floor surface is oriented horizontally, at least a portion of the second stowage bin is in this case, too, preferably arranged vertically above the bench seat.

In part, without offset in the transverse direction, here means that the second stowage bin and the bench seat overlap at least partially when viewed in a direction perpendicular to the floor surface. The second stowage bin can thus be positioned in the transverse direction, at least in part, between the aisle-side end of the bench seat and the end of the bench seat remote from the aisle-side end. Alternatively, the first stowage bin and/or the second stowage bin can be arranged wholly without offset in the transverse direction relative to the bench seat. Furthermore, both the first stowage bin and the second stowage bin can be arranged in the transverse direction on the same side with respect to the aisle-side end of the first seat. The second stowage bin can be spaced apart from the first stowage bin in the transverse direction by not more than the width of the bench seat in the transverse direction.

In a variant, the first stowage bin is arranged, at least in part, without offset in the transverse direction relative to the first seat, and/or the second stowage bin is arranged offset in the transverse direction relative to the first seat. The second stowage bin can be arranged offset, at least in part, in the transverse direction relative to the bench seat as a whole. For example, the overlap between the second stowage bin and the bench seat, when viewed perpendicularly to the floor surface, can be not more than 50% or not more than 30% of the base area of the stowage bin, in particular, in the open or closed state thereof.

Furthermore, a distance between the floor surface and the first stowage bin can be greater than a distance between the floor surface and the second stowage bin. In particular, where there is a large offset in the transverse direction (i.e., lateral offset) of the second stowage bin relative to the bench seat, the headroom and freedom of movement in the region of the bench seat can thereby be improved. Advantageously, the height of the first stowage bin is greater than the height of the second stowage bin. Height here denotes the maximum extent of the stowage bin in question in a direction perpendicular to the floor surface, that is to say, when viewed in the cross-sectional plane, in a direction perpendicular to the transverse direction. For example, the height of the first stowage bin can be 1.5 times the height of the second stowage bin.

In one embodiment, the second stowage bin has at least two side wall sections and a base section. Optionally, the second stowage bin can further have at least one top section. The side wall sections can each be pivotable about a side wall axis extending perpendicularly to the longitudinal direction, preferably in the cross-sectional plane, the base section can be pivotable about a base section axis extending in the longitudinal direction, and the top section can be pivotable about a top section axis likewise extending in the longitudinal direction.

Furthermore, at least the first seat of the bench seat can have at least one seat back and at least one seat surface. In this case, the seat back is preferably pivotable relative to the seat surface about a seat axis until a surface of the seat back that faces towards the seat surface comes into contact at least in part with the seat surface. The seat axis preferably corresponds to an intersecting axis between the main planes of the seat back and the seat surface of the first seat and defines the orientation of the bench seat. In addition, the bench seat can be pivotable about a bench seat axis extending in the longitudinal direction from a first position, in which the seat axis extends substantially in the transverse direction, into a second position, in which the seat axis is oriented transversely with respect to the transverse direction.

In a further embodiment, the first stowage bin comprises a first section which is pivotable about a first stowage bin axis between an open position and a closed position in order to make a first interior of the first stowage bin accessible when the first section is in the open position and in order to close the first interior of the first stowage bin when the first section is in the closed position. Furthermore, the second stowage bin can comprise a second section which is pivotable about a second stowage bin axis between an open position and a closed position in order to make a second interior of the second stowage bin accessible when the second section is in the open position and in order to close the second interior of the second stowage bin when the second section is in the closed position. The second stowage bin can preferably be opened and closed independently of the first stowage bin in that the second section is pivoted independently of the first section. The first and second sections can thus be pivotable separately from one another.

The first section can additionally be adapted, for example when viewed in the cross-sectional plane, to pivot in a first direction of rotation about the first stowage bin axis in order to move from its closed position into its open position, and the second section can be adapted to pivot in a second direction of rotation about the second stowage bin axis in order to move from its closed position into its open position. The first direction of rotation is preferably the same as the second direction of rotation. When viewed in the cross-sectional plane, the first direction of rotation is in this case directed clockwise when the second direction of rotation is directed clockwise, and the first direction of rotation is directed counter-clockwise when the second direction of rotation is directed counter-clockwise.

In a further variant, the second section is further pivotable into an additional position by rotation of the second section about the second stowage bin axis, starting from its closed position in an opposite direction to the open position. The second stowage bin can be adapted to be folded up so that the second interior is reduced from a first volume to a smaller second volume. A width of the second stowage bin, when viewed in the cross-sectional plane, in the transverse direction is thereby preferably smaller when the second interior has the second volume than when the second interior has the first volume. On folding, one or more of the side wall sections, the base section and/or the top section can be pivoted about the associated side wall axis or base section axis in order to reach its respective folded-in position.

In a further embodiment, the aircraft stowage bin system has a holding device which is adapted to hold the second stowage bin in its closed position. The holding device can comprise, for example, a locking assembly with a catch. The holding device can be mounted, at least in part, on a ceiling part of the aircraft region. The holding device or the locking assembly can further be adapted to hold the bench seat in its second position. The holding device can comprise an additional holding element which is adapted to releasably connect, preferably releasably lock, the second section to the base section 142. This additional holding element can be fixed, for example, to the base section or to the second section, in particular when the second stowage bin is in the form of a fixed bin.

An aircraft has an aircraft region described in detail above. Preferably, the aircraft is a double-deck aircraft with one or more aisles and the aircraft region is a main deck or a lower level. Further preferably, the aircraft region has only one aisle section. The lower level of the aircraft preferably contains only one aircraft longitudinal aisle.

Furthermore, a method of loading an above-described aircraft region comprises the steps of releasing the holding device, rotating the second section about the second stowage bin axis starting from the closed position of the (second section of the) second stowage bin in the opposite direction to the open position of the (second section of the) second stowage bin into the additional position, pivoting the bench seat about the bench seat axis from the first position, in which the seat axis extends substantially in the transverse direction, into the second position, in which the seat axis extends transversely with respect to the transverse direction, and holding the bench seat in its second position by means of the holding device.

BRIEF DESCRIPTION OF THE DRAWINGS

Preferred embodiments of an aircraft region and of an aircraft will now be described in greater detail with reference to the accompanying schematic drawings, in which.

DETAILED DESCRIPTION OF THE PREFERRED EMBODIMENTS

Figure 1A:
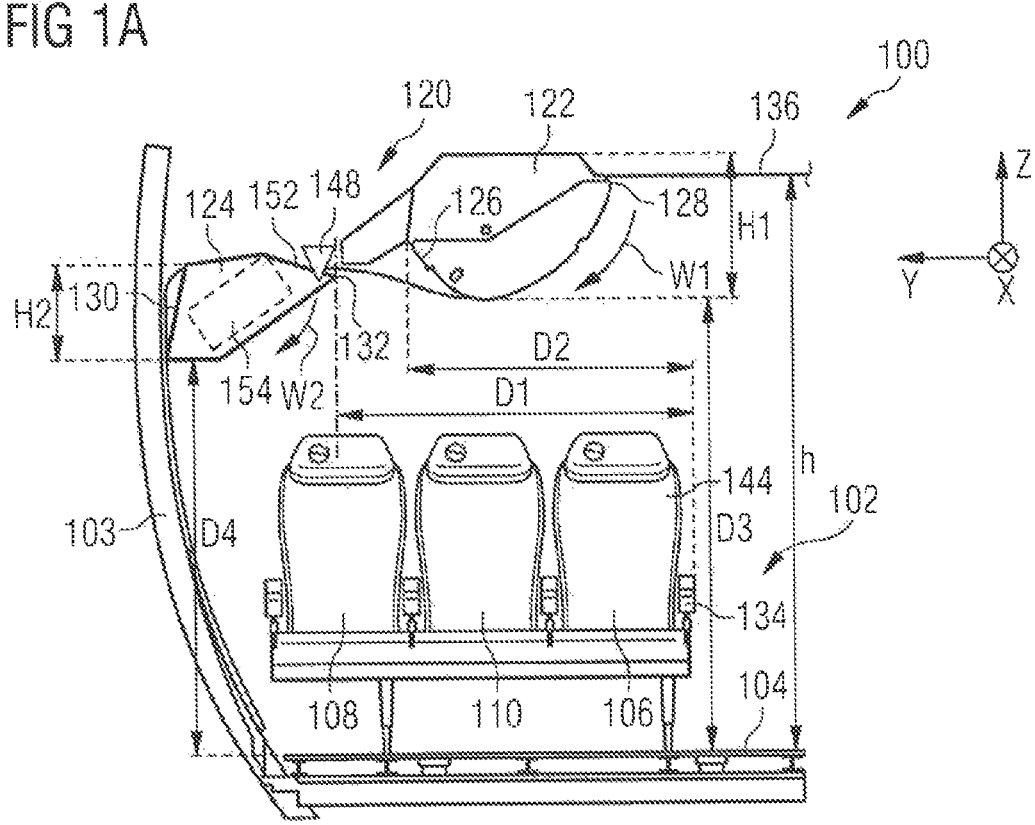
FIG. 1a is a rear view of an aircraft region, wherein the second stowage bin is in the form of a movable bin and wherein the second section of the second stowage bin is in its closed position.
Figure 1B:
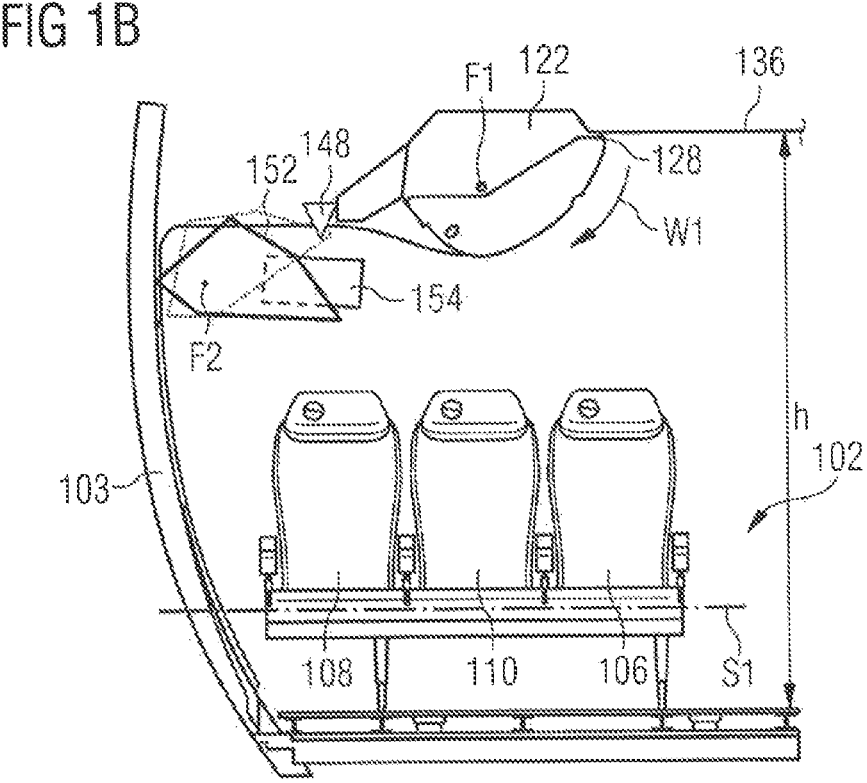
FIG. 1b is a rear view of the aircraft region of FIG. 1a, wherein the second section of the second stowage bin is in its open position.

FIGS. 1a and 1b, as well as 2a-d, show an aircraft region 100. The aircraft region 100 comprises an aisle section 102, which extends in the longitudinal direction X of the aircraft region 100, a wall section 103, a floor part 104, which extends in a plane spanned by the longitudinal direction X and a transverse direction Y perpendicular to the longitudinal direction X, and a bench seat 105, which is oriented in the transverse direction Y. The bench seat 105 contains a first seat 106 adjoining the aisle section 102, which is in the form of an aisle-side seat, a second seat 108 remote from the first seat 106, which is arranged adjacent to a side of the bench seat 105 that is remote from the aisle section 102 and is in the form of a wall-side seat, and a middle seat 110 arranged between the first seat 106 and the wall-side seat 108. The wall section 103 is curved in a cross-sectional plane spanned by the transverse direction Y and a height direction Z oriented perpendicularly to the transverse direction Y and to the longitudinal direction X and extends in the height direction Z substantially along an aircraft cabin outside wall. When the aircraft region, for example as here, is part of an aircraft which is on the ground, the floor part 104 is oriented horizontally. The longitudinal direction X and the transverse direction Y then extend horizontally and the height direction extends vertically.

The aircraft region 100 further comprises an aircraft stowage bin system 120 having a first stowage bin 122 and a second stowage bin 124. The first stowage bin 122 is arranged above the first seat 106 and the second stowage bin 124 is arranged above the second seat 108. As is apparent, in particular, from FIGS. 1a and 1b, a passenger who is sitting on the second seat 108 or standing in front of that seat 108 is able to reach his piece of luggage 154 without stepping into the aisle section. Both the first stowage bin 122 and the second stowage bin 124 are in the form of movable bins. Alternatively, the first stowage bin 122 can be in the form of a fixed bin. The first stowage bin 122 has a first rear side 126 which faces away from the aisle section 102 in the transverse direction Y and faces towards the wall section 103, and a first end 128 which is remote from the first rear side and faces towards the aisle section 102 in the transverse direction Y. The second stowage bin 124 likewise has a second rear side 130 which faces away from the aisle section 102 in the transverse direction Y and faces towards the wall section 103, and a second end 132 remote from the second rear side 130.

A first transverse distance D1 (distance in the transverse direction Y) between the second end 132 of the second stowage bin 124 and an aisle-side end 134 of the first seat 106 is, in particular, in the cross-sectional plane, greater than a second transverse distance D2 (distance in the transverse direction Y) between the first rear side 126 and the aisle-side end 134 of the first seat 106 both when the first and second stowage bins are closed and when the first and second stowage bins are open. The first stowage bin 122, in particular, when viewed in the cross-sectional plane, is arranged wholly opposite the bench seat 105 without offset in the transverse direction Y. The first and second stowage bins 122, 124 are arranged, in the transverse direction Y, on the same side, facing towards the wall section 103, with respect to the aisle-side end 134 of the first seat 106. Furthermore, the second stowage bin 124 is spaced apart from the first stowage bin 122 in the transverse direction Y by the difference between the distances D1 and D2, D1 minus D2. The distance between the first and second stowage bins 122, 124 is less than half the width of the bench seat in the transverse direction Y, in particular less than a width of the first seat 106 in the transverse direction Y. The first and second stowage bins 122, 124 are thus separate from one another. There is no further stowage bin for passenger luggage between the first and second stowage bins 122, 124, in particular, in the transverse direction Y.

The first stowage bin 122 partially overlaps/overhangs the first seat 106, so that it is arranged, in part, without offset in the transverse direction Y relative to the first seat 106. The first end 128 of the first stowage bin 122 is thus arranged in the height direction Z vertically above the first seat 106 and in the transverse direction Y between the transverse ends of the first seat 106. The second stowage bin 124, on the other hand, is arranged offset in the transverse direction Y relative to the first seat 106, without overlapping/overhanging the first seat 106.

In addition, a distance D3 between a floor surface of the floor part 104 facing towards the stowage bins 122, 124 and the first stowage bin 122 is greater than a distance D4 between the floor surface and the second stowage bin 124. The difference between the distances D3 and D4 corresponds approximately or at most to a difference between a distance h in the height direction Z between a ceiling part 136 and the floor surface minus the distance D3. The height H1 of the first stowage bin 122 in the height direction Z is at least 25% greater, here, for example, approximately 50% greater, than a height H2 of the second stowage bin 124 in the height direction Z, in particular when viewed in the cross-sectional plane. In this respect, the first and second stowage bins 122, 124 overlap in the height direction Z when viewed in the cross-sectional plane.

Figure 2A:
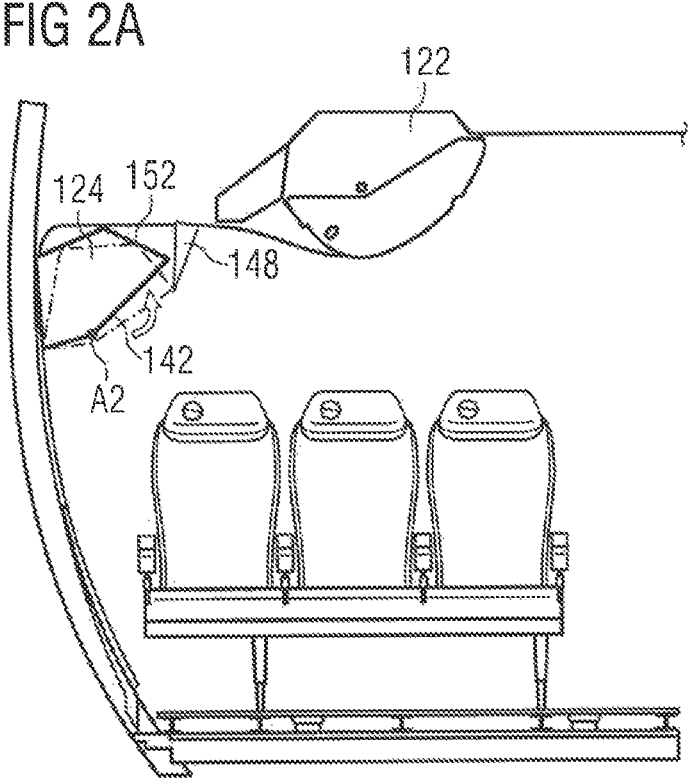
FIG. 2a is a rear view of the aircraft region of FIG. 1a, wherein the second section of the second stowage bin is in the additional position.
Figure 2B:
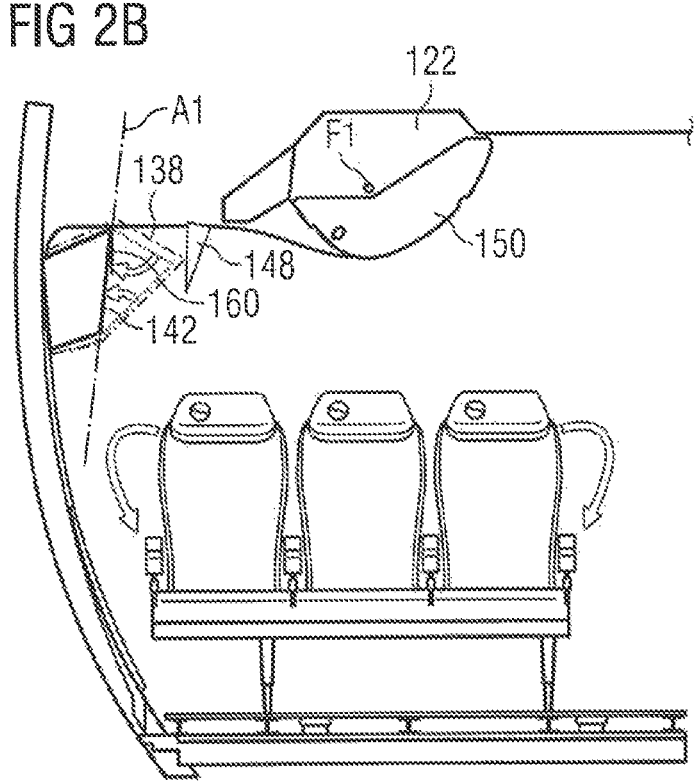
FIG. 2b is a rear view of the aircraft region of FIG. 1a, wherein the base section and the top section are in their folded-in position.
Figure 2C:
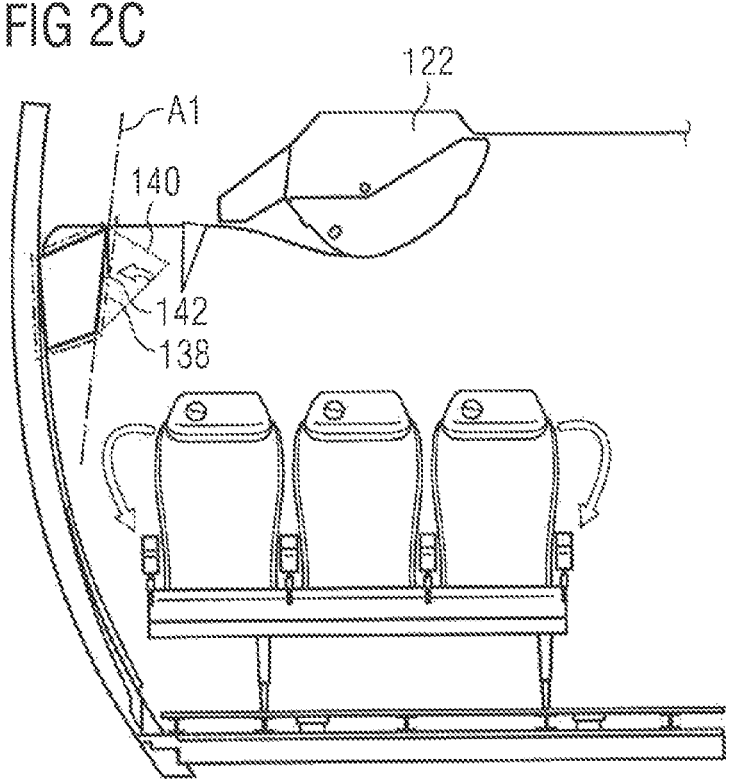
FIG. 2c is a rear view of the aircraft region of FIG. 1a, wherein the base section, the top section and one of the side wall sections are in their folded-in position.

As is shown in FIGS. 2*b* and 2*c*, the second stowage bin 124 has a first side wall section 138 and a second side wall section 140 as well as a base section 142. The first side wall section 138 is pivotable about a side wall axis A1 extending in the cross-sectional plane substantially in the height direction Z between its folded-out position and its folded-in position, and the second side wall section 140 is pivotable about a further axis extending parallel to the side wall axis A1 between its folded-out position and its folded-in position. In their folded-out position, the side wall sections 138, 140 extend substantially parallel to the cross-sectional plane, and in their folded-in position, the side wall sections 138, 140 extend substantially perpendicularly to the cross-sectional plane, that is to say in the longitudinal direction X. The base section 142 extends in the longitudinal direction X and is pivotable about a base section axis A2 extending in the longitudinal direction between its folded-out position, in which the base section 142 is inclined by less than 45 degrees, preferably less than 30 degrees, relative to the floor surface, and its folded-in position, in which the base section 142 is oriented substantially perpendicularly to the floor surface.

Figure 2D:
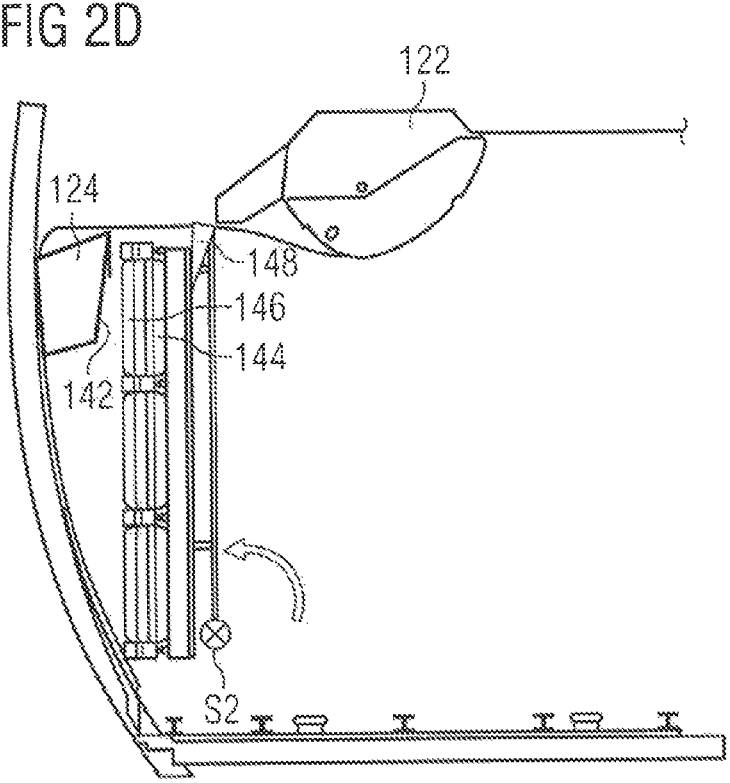
FIG. 2d is a rear view of the aircraft region of FIG. 1a, wherein the base section, the top section and both the side wall sections are in their folded-in position and the bench seat is in its second position.

The first seat 106 has a seat back 144 and a seat surface 146. The second seat 108 and the middle seat 110 can each have the same form as the first seat 106, so that the following observations apply correspondingly to the seats 108 and 110. The seat back 144 is pivotable about a seat axis S1 relative to the seat surface 146, starting from its upright position shown, for example, in FIGS. 1*a* and 1*b* and extending parallel to the cross-sectional plane, into a folded position shown in FIG. 2*d*, until a portion of a surface of the seat back 144 adjacent to the seat surface 146 comes into contact with the seat surface 146. The seat back 144 of the first seat 106 is pivotable, in this example, through at least 60° or at least 75° or at least 90° about the seat axis S1 in the direction towards the seat surface 146. Furthermore, the bench seat 105 is pivotable about a bench seat axis S2 extending in the longitudinal direction from a first position shown, for example, in FIGS. 2*a*-2*c*, in which the seat axis S1 extends substantially in the transverse direction Y, into a second position shown in FIG. 2*d*, in which the seat axis S1 extends transversely with respect to the transverse direction, in particular in the height direction Z. As is additionally shown in FIG. 2*d*, the aisle-side end 134 of the first seat 106, when the bench seat has assumed its second position, is situated between the first and second stowage bins 122, 124 and is held in the second position by a holding device 148, for example by means of a locking assembly, described in greater detail below.

The first stowage bin 122 in the form of a movable bin comprises a first section 150 in the form of a chute, which is pivotable about a first stowage bin axis F1 between an open position, which is not shown, and a closed position, which is shown in all the figures, in order to make a first interior of the first stowage bin 122 accessible when the first section 150 is in the open position and in order to close the first interior of the first stowage bin 122 when the first section 150 is in the closed position. The second stowage bin 124, which here is also in the form of a movable bin, comprises a second section 152 which is also in the form of a chute and which is pivotable, for example through at least 30°, about a second stowage bin axis F2 between an open position shown in FIG. 1*b* and a closed position shown, for example, in FIG. 1*a*, in order to make a second interior of the second stowage bin 124, which receives a piece of luggage 154, accessible when the second section 152 is in the open position and in order to close the second interior of the second stowage bin 124 when the second section 152 is in the closed position. The first section 150 of the first stowage bin 122 is separate from the second section 152 of the second stowage bin 124, so that the first and second sections 150, 152 are pivotable separately from one another.

The first section 150 is adapted to pivot, when viewed in the cross-sectional plane, about the first stowage bin axis F1 in a first direction of rotation W1 in order to move from its closed position into its open position, and the second section 152 is adapted to pivot about the second stowage bin axis F2 in a second direction of rotation W2 in order to move from its closed position into its open position. The directions of rotation W1 and W2 correspond to the direction of rotation in which the bench seat 105 is pivoted about the bench seat axis S2 in order to be brought from its second position into its first position. In the view of FIGS. 1*a* and 1*b*, both the first direction of rotation and the second direction of rotation are directed clockwise.

The second section 152 is additionally pivotable about the second stowage bin axis F2 counter-clockwise, that is to say, in an opposite direction W2 to the open position shown in FIG. 1*b*, starting from its closed position shown in FIG. 1*a*, into an additional position shown in FIG. 2*a*. In this additional position, the distance in the transverse direction Y between the first stowage bin 122 and the second stowage bin 124 is greater than in the closed position. In addition, the second stowage bin 124 is then spaced apart further in the transverse direction Y relative to the bench seat 105. Furthermore, the distance in the transverse direction Y between the first stowage bin 122 and the second stowage bin 124 is greater in the closed position of the stowage bin than in its open position.

As is shown in FIGS. 2*a*-2*d*, the second stowage bin 124 can be folded up so that the second interior is reduced from a first volume to a smaller second volume. A width, when viewed in the cross-sectional plane, of the second stowage bin 124 in the transverse direction Y is thereby reduced, that is to say, the width of the second stowage bin 124, in particular of its interior, is smaller when the second interior has the second volume than when the second interior has the first volume. At the beginning of the folding operation, the second stowage bin 124 is brought into its additional position shown in FIG. 2*a*, whereby the holding device 148 is released. The second rear side 130 is then oriented substantially in the height direction Z. The base section 142 is then pivoted about the base section axis A2 contrary to the directions of rotation W1 and W2 in order to be brought into its folded-in position (see FIG. 2b). Since the second stowage bin 124 has a pivotable top section 160, the top section is pivoted in the same direction as the directions of rotation W1 and W2 about an axis parallel to the base section axis A2, in order to be brought into its folded-in position. Then, first the first side wall section 138 and then the second side wall section 140 is pivoted into its folded-in position (FIGS. 2b and 2c). The second stowage bin 124, which is now folded up, is offset in the transverse direction Y relative to the whole bench seat 105, which is in its first position, and relative to the holding device 148, so that the bench seat 105 is now pivoted into its second position and is held in that second position by means of the holding device 148. In this respect, the holding device 148 serves on the one hand for holding the second section 152 in its closed position and on the other hand for holding the bench seat 105 in its second position. For that purpose, the holding device has a releasable locking assembly.

A further aircraft section 200, shown in FIGS. 3a to 3d, differs from the aircraft section 100 in that the second stowage bin 124 is in the form of a fixed bin. Here too, the first stowage bin 122 is in the form of a movable bin. Alternatively, it can be in the form of a fixed bin however.

As is shown in FIGS. 3a-3d, this second stowage bin 124 can also be folded up so that the second interior is reduced from a first volume to a smaller second volume. The second volume is here extremely small, almost zero. A width, viewed in the cross-sectional plane, of the second stowage bin 124 in the transverse direction Y is thereby reduced, that is to say, the width of the second stowage bin 124, in particular of the interior thereof, is smaller when the second interior has the second volume than when the second interior has the first volume.

The second section 152 is here in the form of a cover flap which is pivotable about a second stowage bin axis F2 extending in the longitudinal direction X in order to open or close the second stowage bin. The second section 152 is adapted, in particular, to pivot about the second stowage bin axis F2 in a second direction of rotation W2 in order to move from its closed position shown in FIG. 3a to its open position shown in FIG. 3b. The directions of rotation W1 and W2 are here mutually opposite, and the direction of rotation W2 corresponds to the direction of rotation in which the bench seat 105 is pivoted about the bench seat axis S2 in order to be brought from its first position into its second position. In the view of FIGS. 3a-d, the first direction of rotation W1 is directed clockwise and the second direction of rotation W2 is directed counter-clockwise.

Figure 3A:
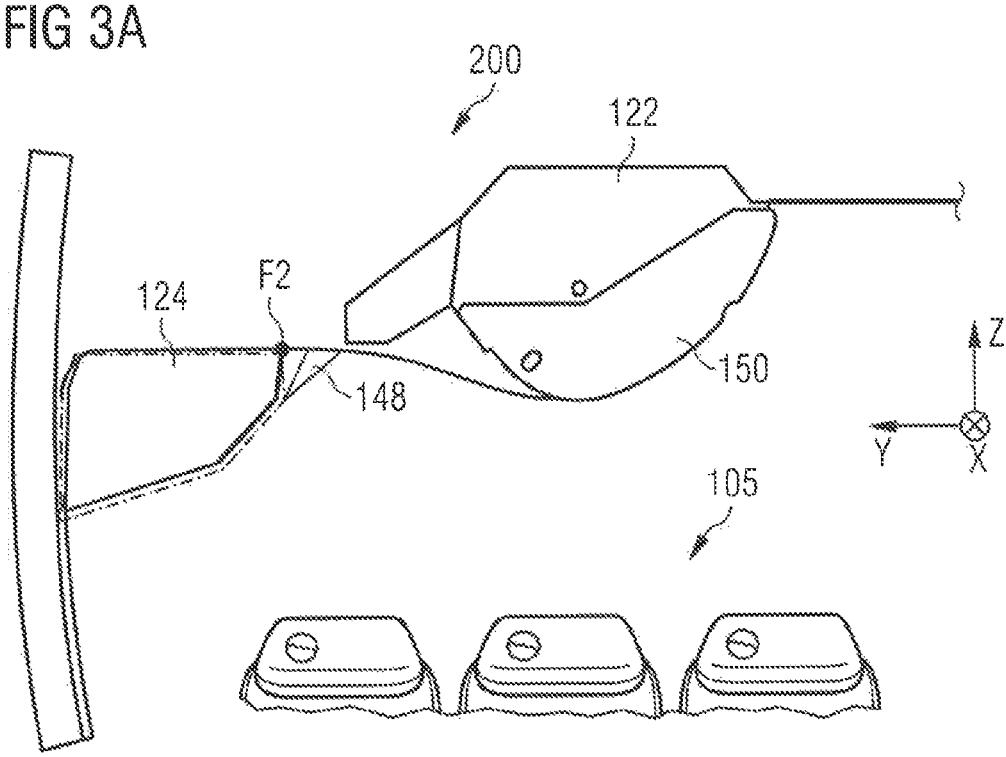
FIG. 3a is a rear view of a further aircraft region, wherein the second stowage bin is in the form of a fixed bin and wherein the second section of the second stowage bin is in the closed position.
Figure 3B:
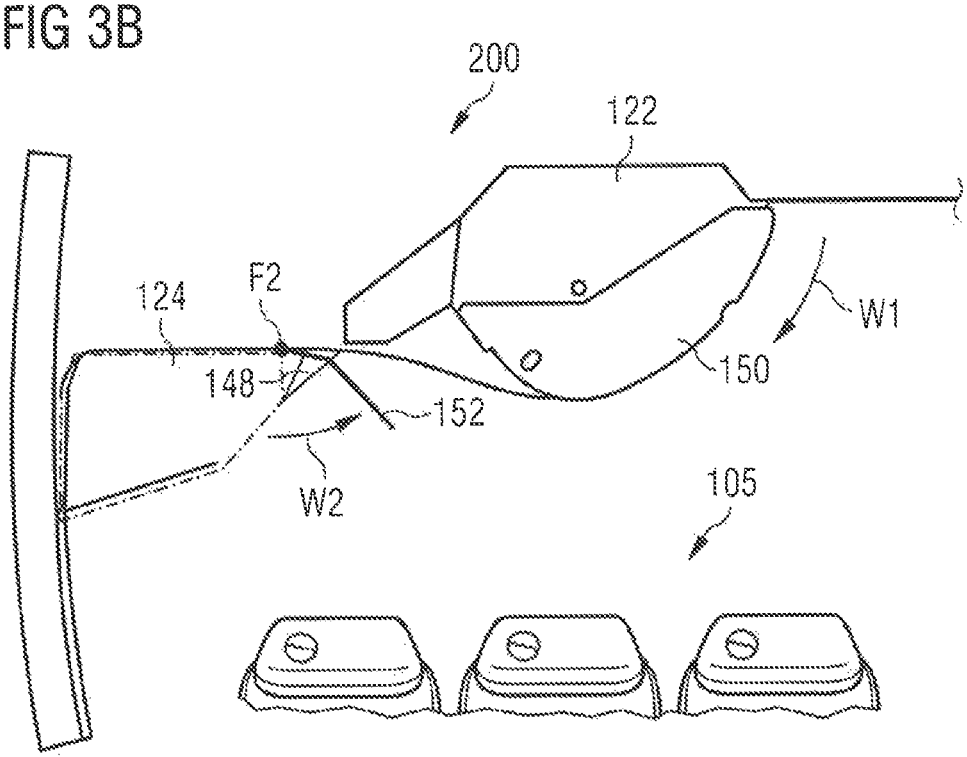
FIG. 3b is a rear view of the aircraft region of FIG. 3a, wherein the second section of the second stowage bin is in the open position.
Figure 3C:
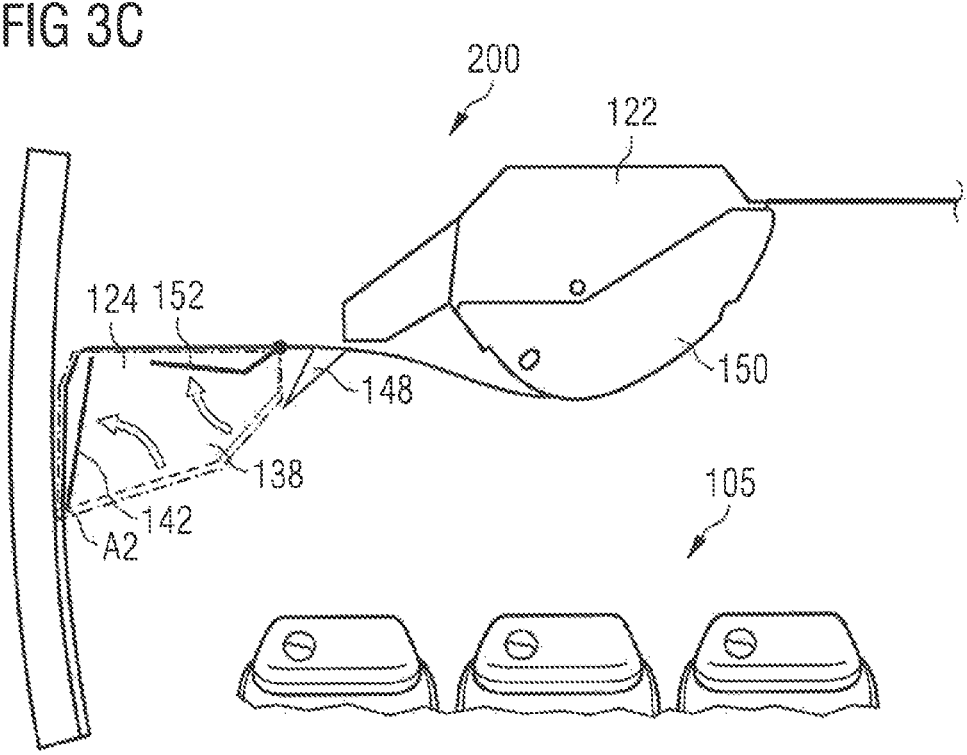
FIG. 3c is a rear view of the aircraft region of FIG. 3a, wherein the second section of the second stowage bin is in the additional position.
Figure 3D:
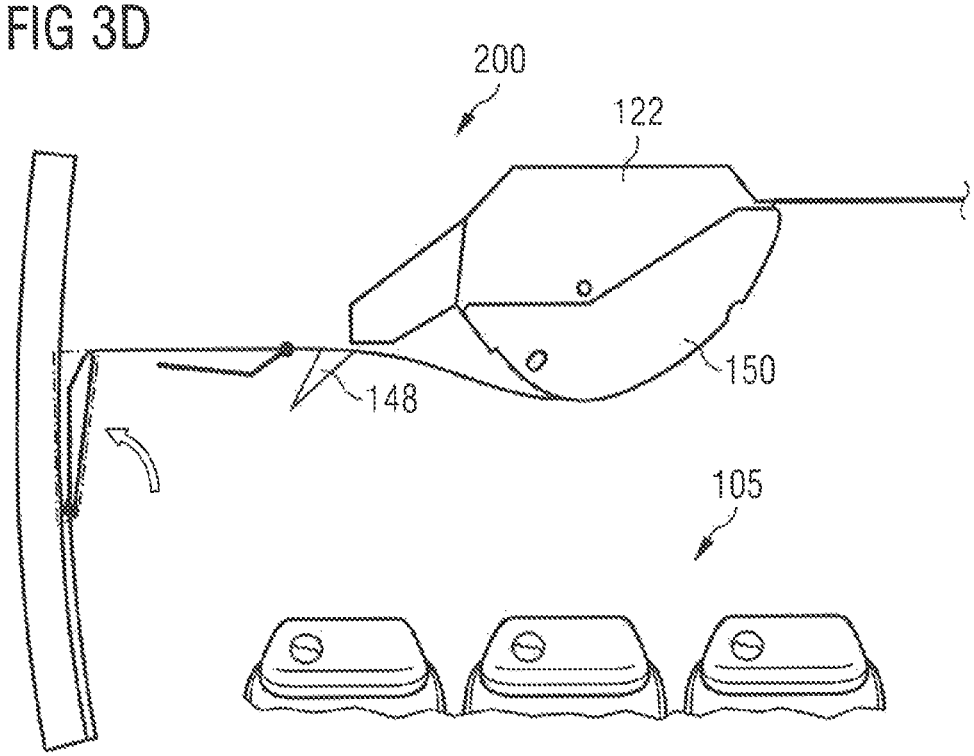
FIG. 3d is a rear view of the aircraft region of FIG. 3a, wherein the second section of the second stowage bin is in the additional position and wherein the base section, the top section and both the side wall sections are in their folded-in position.

The second section 152 is additionally pivotable about the second stowage bin axis F2, starting from its closed position shown in FIG. 3a, clockwise, that is to say, in an opposite direction W2 to the open position shown in FIG. 3b, into an additional position shown in FIG. 3c. In this additional position, the second stowage bin 124 can optionally be spaced further apart in the transverse direction Y from the bench seat 105 than in the closed position of the second section 152. Furthermore, the distance in the transverse direction Y between the first stowage bin 122 and the second stowage bin 124 is here also greater in the closed position of the second section 152 than in the open position of the second section 152.

At the beginning of the folding operation, the second stowage bin 124 is brought into its additional position shown in FIG. 3c, for which purpose the holding device 148 is released. The base section 142 is then pivoted about the base section axis A2 in the direction of rotation W2 in order to be brought into its folded-in position (see FIG. 3c). Then, first the first side wall section 138 and then the second side wall section, which is not shown, is pivoted into its folded-in position (see FIG. 3d). The second stowage bin 124, which is now folded up, in particular the side wall sections and the base section 142 thereof, is offset in the transverse direction Y relative to the whole bench seat 105 and relative to the holding device 148, so that the bench seat 105 can be pivoted into its second position and can be held in that second position by means of the same holding device 148. In this respect, the holding device 148 serves, on the one hand, for holding the second section 152 in its closed position and, on the other hand, for holding the bench seat 105 in its second position. The holding device 148 in this embodiment comprises an additional holding element which is adapted to releasably connect, preferably releasably lock, the second section 152 to the base section 142, in order to hold the second section 152 in its closed position. This additional holding element can be fixed, for example, to the base section 142 or to the second section 152.

Otherwise, the aircraft section 200 has all the features of the aircraft section 100.

Overall, the aircraft region described here is distinguished by greater flexibility during loading. On the one hand, the stowage space available to passengers for luggage can be increased. On the other hand, great headroom or a large cabin height can be achieved. The installation space available in the aircraft region can be used efficiently. If more headroom is not required, the cabin height, and thus the cross-sectional area of the aircraft region, can be reduced, whereby the aircraft air resistance can be reduced. In addition, the passengers are able to stow their luggage more flexibly. If the bench seat has three seats, for example, the passenger to whom the wall-side seat has been allocated, in particular, is able to stow his hand luggage in the second stowage bin. On leaving the aircraft, that passenger is able to remove his hand luggage from the second stowage bin even before he steps into the aisle section. The passengers are therefore able to leave the aircraft more quickly overall, so that the turnaround can be shortened. The pivotable bench seat further contributes towards shortening the turnaround and to flexible loading and use of the stowage space.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An aircraft region comprising:
an aisle section extending in a longitudinal direction of the aircraft region,
a bench seat oriented transversely with respect to the longitudinal direction and having a first seat adjacent to the aisle section and a second seat which is arranged adjacent to a side of the bench seat that is remote from the aisle section, and an aircraft stowage bin system which has a first stowage bin arranged at least in part above the first seat and a second stowage bin arranged at least in part above the second seat, wherein the first stowage bin has a first rear side facing away from the aisle section, and the second stowage bin has a second rear side facing away from the aisle section, wherein the second stowage bin is arranged above the second seat in such a way that it is accessible for a person sitting on the second seat or standing in the longitudinal direction in front of the second seat, wherein the first stowage bin comprises a first section which is pivotable about a first stowage bin axis between an open position and a closed position in order to make a first interior of the first stowage bin accessible when the first section is in the open position and in order to close the first interior of the first stowage bin when the first section is in the closed position, and wherein the second stowage bin comprises a second section which is pivotable about a second stowage bin axis between an open position and a closed position in order to make a second interior of the second stowage bin accessible when the second section is in the open position and in order to close the second interior of the second stowage bin when the second section is in the closed position.

2. The aircraft region as claimed in claim 1, wherein, in a cross-sectional plane extending perpendicularly with respect to the longitudinal direction, a first transverse distance between a second end of the second stowage bin that is remote from the second rear side and an aisle-side end of the first seat is greater than a second transverse distance between the first rear side and the aisle-side end of the first seat.

3. The aircraft region as claimed in claim 1, wherein a distance between a floor surface, which extends in the longitudinal direction beneath the bench seat, of the aircraft region and the first stowage bin is greater than a distance between the floor surface and the second stowage bin.

4. The aircraft region as claimed in claim 1, wherein a height of the first stowage bin perpendicular to the longitudinal direction is greater than a height of the second stowage bin perpendicular to the longitudinal direction.

5. The aircraft region as claimed in claim 1, wherein the second stowage bin has at least two side wall sections and a base section, wherein, in order to fold up the second stowage bin to reduce its volume, the side wall sections are each pivotable about a side wall axis extending perpendicularly to the longitudinal direction, and the base section is pivotable about a base section axis extending in the longitudinal direction.

6. The aircraft region as claimed in claim 1,
wherein at least the first seat of the bench seat has at least one seat back and at least one seat surface,
wherein the seat back is pivotable about a seat axis relative to the seat surface until a surface of the seat back facing towards the seat surface is in contact at least in part with the seat surface, and
wherein the bench seat is pivotable about a bench seat axis extending in the longitudinal direction from a first position, in which the seat axis extends substantially in a transverse direction perpendicular to the longitudinal direction, into a second position, in which the seat axis extends transversely with respect to the transverse direction.

7. The aircraft region as claimed in claim 1, wherein the first and second sections are pivotable separately from one another.

8. The aircraft region as claimed in claim 1, wherein the first section is configured to pivot about the first stowage bin axis in a first direction of rotation in order to move from its closed position into its open position, and the second section is configured to pivot about the second stowage bin axis in a second direction of rotation in order to move from its closed position into its open position, wherein the first direction of rotation is the same as the second direction of rotation.

9. The aircraft region as claimed in claim 1, wherein the second section is further pivotable into an additional position by rotation of the second section about the second stowage bin axis starting from its closed position in an opposite direction to the open position.

10. The aircraft region as claimed in claim 1, wherein the second stowage bin is configured to be folded up so that the second interior is reduced from a first volume to a smaller second volume, wherein a width of the second stowage bin perpendicularly to the longitudinal direction is smaller when the second interior has the second volume than when the second interior has the first volume.

11. The aircraft region as claimed in claim 1, wherein the second stowage bin has a holding device which is configured to hold the second stowage bin in its closed position.

12. The aircraft region as claimed in claim 11, wherein the holding device is further configured to hold the bench seat in its second position.

13. An aircraft having an aircraft region as claimed in claim 1.

14. A method of loading an aircraft region, wherein the aircraft region comprises:
an aisle section extending in a longitudinal direction of the aircraft region,
a bench seat oriented transversely with respect to the longitudinal direction and having a first seat adjacent to the aisle section and a second seat which is arranged adjacent to a side of the bench seat that is remote from the aisle section, and
an aircraft stowage bin system which has a first stowage bin arranged at least in part above the first seat and a second stowage bin arranged at least in part above the second seat,
wherein the first stowage bin has a first rear side facing away from the aisle section, and the second stowage bin has a second rear side facing away from the aisle section,
wherein the second stowage bin is arranged above the second seat in such a way that it is accessible for a person sitting on the second seat or standing in the longitudinal direction in front of the second seat,
wherein the first stowage bin comprises a first section which is pivotable about a first stowage bin axis between an open position and a closed position in order to make a first interior of the first stowage bin accessible when the first section is in the open position and in order to close the first interior of the first stowage bin when the first section is in the closed position,
wherein the second stowage bin comprises a second section which is pivotable about a second stowage bin axis between an open position and a closed position in order to make a second interior of the second stowage bin accessible when the second section is in the open position and in order to close the second interior of the second stowage bin when the second section is in the closed position, and wherein the second stowage bin has a holding device which is configured to hold the second stowage bin in its closed position, the method comprising the steps:

releasing the holding device, rotating the second section about the second stowage bin axis into an additional position, starting from the closed position of the second stowage bin in an opposite direction to the open position of the second stowage bin, pivoting the bench seat about a bench seat axis from a first position, in which the bench seat axis extends substantially in the transverse direction, into a second position, in which the bench seat axis extends transversely with respect to the transverse direction, and holding the bench seat in its second position by means of the holding device.

\* \* \* \* \*